UNITED STATES PATENT OFFICE 2,669,558

CYANO ETHER-ESTERS

David T. Mowry, Kirkwood, Mo., Eugene L. Ringwald, Decatur, Ala., and George L. Wesp, Englewood, Ohio, assignors to Monsanto Chemical Company, St. Louis, Mo., a corporation of Delaware No Drawing. Application December 17, 1951,
Serial No. 262,157

17 Claims. (Cl. 260—88.7)

The present invention relates to unsaturated cyano ether-esters.

According to the invention there are provided new and valuable cyanoalkoxyalkyl esters of acrylic acid having the formula

in which R, R', R'' and R''' are selected from the class consisting of hydrogen and the methyl radical and $n$ is an integer of from 1 to 3.

We have found that compounds having the above formula are readily prepared by contacting, in the presence of an esterifying catalyst, acrylic acid or an acid halide thereof such as acrylyl chloride or acrylyl bromide with a hydroxyalkoxy nitrile having the general formula

in which R, R', R'', and R''' and $n$ are defined above. Hydroxyalkoxy nitriles having this formula are easily obtainable by the addition of acrylonitrile or methacrylonitrile to alkylene glycols or to polyalkylene glycols having the formula

in which $x$ is 0, 1 or 2. As examples of useful hydroxyalkoxy nitriles may be mentioned the 2-(2-hydroxyethoxy)propionitrile obtainable from ethylene glycol and acrylonitrile; the 2-(2-hydroxyethoxy)-1-methylpropionitrile obtainable from ethylene glycol and methacrylonitrile; the 2-(2-hydroxypropoxy)propionitrile obtainable from propylene-1,2-glycol and acrylonitrile; the 2-(2-hydroxy-1-methylpropoxy)-propionitrile obtainable from 2,3-butylene glycol and acrylonitrile; the 2-[2-(2-hydroxyethoxy)-ethoxy] propionitrile obtainable by reaction of diethylene glycol and acrylonitrile; and the hydroxy polyalkoxyalkylene nitriles obtainable by reaction of such polyglycols as triethylene glycol or tripropylene glycol with acrylonitrile or methacrylonitrile.

Examples of cyano ether-esters provided by the present invention are: 2-(2-cyanoethoxy)-ethyl acrylate which is obtainable from acrylic acid and 2-(2-hydroxyethoxy)propionitrile; 2-(2-cyanopropoxy)ethyl acrylate which is obtainable from acrylic acid and 2-(2-hydroxyethoxy)-1-methylpropionitrile; 2-[2-(2-cyanoethoxy)-ethoxy] ethyl acrylate which is obtainable from acrylic acid and 2-[2-(2-hydroxyethoxy)ethoxy] propionitrile; 1-(2-cyanoethoxy)-2-propyl acrylate which is obtainable from acrylic and 2-(2-hydroxypropoxy)propionitrile, etc.

Preparation of the present cyanoalkoxyalkyl acrylates is effected by simply contacting the hydroxy nitrile with acrylic or an acid halide or anhydride thereof at ordinary or increased temperatures and in the presence of an esterifying catalyst until formation of said acrylates has occurred. They may also be prepared by ester interchange. Advantageously, refluxing temperatures of the reaction mixtures are employed. Esterifying catalysts which may be used are organic or inorganic acids or basic materials such as sulfuric acid, hydrochloric acid, benzenesulfonic acid, potassium hydroxide, sodium acetate, sodium methoxide, etc. In order to prevent polymerization of the acrylic acid or acid halide during the reaction, the condensation is advantageously effected in the presence of an inhibitor of polymerization, e. g., pyrogallol, hydroquinone, diphenylamine, methylene blue, etc. To provide for easy removal of reaction water, the condensation is also advantageously effected in the presence of a solvent which has the property of forming azeotropes with water, e. g., toluene or xylene. Completion of the reaction generally can be ascertained by noting cessation in evolution of water. Subsequent manipulation of the reaction mixture depends upon the nature of initial materials employed and upon uses to which the product is to be put. In many instances the crude reaction mixture may be used directly, without removing therefrom such possible constituents as esterifying catalyst, inhibitor of polymerization, unreacted acid or hydroxy nitrile, etc. When a substantially pure product is desired, however, it is customary to treat the crude reaction product with aqueous acid or base in order to wash out the acidic or basic catalyst, and to remove any solvent or unreacted material present by distillation.

The present cyanalkoxyalkyl acrylates are generally clear, rather high boiling liquids which may be employed for a wide variety of industrial and agricultural purposes.

When subjected to polymerizing conditions they yield vulcanizable rubbery polymers. These polymers may be prepared by any of the several polymerization methods known to the art, but the emulsion polymerization method is the most effective. In the practice of the emulsion polymerization technique monomers are contacted in the presence of water which contains dissolved therein a suitable peroxy catalyst and preferably an emulsion stabilizing agent. If desired all of the monomer may be charged to the polymerization reactor at the beginning of the reaction, or may be added periodically or gradually throughout the course of the reaction. Similarly, the catalyst and emulsifying agent may also be introduced either at the start or in increments during the reaction. The preferred method of conducting the polymerization involves adding the monomer gradually to a reaction vessel maintained under the desired conditions for polymerization.

Emulsion polymerizations are catalyzed by means of any water soluble peroxy compound, for example sodium peroxide, hydrogen peroxide, sodium perborate, the sodium salts of other peroxy acids, the potassium, ammonium and other water soluble salts of peroxy acids, and any other water soluble compounds containing a peroxy radical. The quantity of peroxy compound may be from 0.05 to 2.0 per cent by weight of the polymerizable compound. The catalyst may be charged at the beginning of the reaction or it may be added continuously or in increments throughout the course of the reaction for the purpose of maintaining a more uniform concentration of catalyst in the reaction mass. The latter method is preferred because it tends to make the resultant polymer more uniform in physical and chemical properties.

Although the uniform distribution of the reactants throughout the reaction mass can be achieved by vigorous agitation alone, it is generally desirable to promote the uniform distribution of reagents by using wetting agents, or emulsion stabilizers. Suitable agents for this purpose are the water soluble salts of fatty acids, such as sodium oleate, and potassium stearate, mixtures of water soluble fatty acid salts, such as the common soaps prepared by the saponification of animal and vegetable oils, the "amino soaps" such as triethanolamine and dodecyl methyl amine, salts of rosin acids and mixtures thereof, the water soluble salts of half esters of sulfuric acid and long chain alkyl alcohols, sulfonated hydrocarbons, such as alkylarylsulfonates, and any other of the wide variety of wetting agents, which are in general organic compounds containing both hydrophobic and hydrophilic radicals. The quantity of emulsifying agent will depend upon the particular agent selected, the nature of monomer to be used, and the conditions of polymerization. In general, however, from 0.1 to 5 per cent by weight of the monomer may be employed.

The emulsion polymerization reactions are conducted at temperatures between 20 and 100° C., and preferably between 40–60° C. The polymerization temperatures should be maintained substantially constant, and the rate of addition of the monomer so regulated as to maintain this condition. Under such conditions the optimum quality of the product is obtained.

The reaction is preferably initiated by charging the reactor with water containing the catalyst and emulsifier in solution, and thereafter adding the monomer gradually at rates which enable the maintenance of a constant temperature. In order to avoid unduly high concentrations of emulsifier in the reaction mass at the beginning of the reaction most of it may be mixed with the monomer and added therewith during the reaction. Preferably, only a small proportion of the catalyst is charged at the beginning of the reaction and the remainder is added either continuously or intermittently throughout the course of the reaction. The preferred manner of operation involves heating the water containing a small amount of catalyst and emulsifier to approximately the ultimate polymerization temperature and initiating the reaction by introducing the stream of mixed monomers.

The emulsion polymerizations are conducted in glass or glass-lined vessels, which are provided with means for agitating the contents thereof. Generally, rotary stirring devices are the most effective means of insuring the intimate contact of the reagents, but other methods may successfully be employed, for example by rocking or tumbling the reactor. The polymerization equipment generally used is conventional in the art and the fundamental consideration involved in the selection of the equipment is the type of reaction contemplated.

Mixtures of the present cyanoalkoxy alkyl esters with major proportions of vinyl chloride may be subjected to polymerizing conditions to yield improved copolymers, as disclosed in the copending application of David T. Mowry and Richard R. Morner, Serial No. 262,159, filed of even date. Herbicidal compositions comprising oil-in-water emulsions of the present esters are described in the copending application of David T. Mowry and Arthur H. Schlesinger, Serial No. 262,158, also filed of even date.

The present invention is illustrated, but not limited, by the following examples:

*Example 1*

A mixture consisting of 130 g. (1.8 mole) of acrylic acid, 180 g. of 2-(2-hydroxyethoxy)propionitrile (from ethylene glycol and acrylonitrile in the presence of a basic catalyst), 3.0 g. of pyrogallol, 300 ml. of toluene, and 5 ml. of benzenesulfonic acid was heated in a flask equipped with a Dean-Stark water trap at a temperature of 110–118° C. until water stopped coming over. During this time, 20 ml. of water had collected in the trap. The reaction mixture was then allowed to cool to room temperature and washed with aqueous sodium carbonate until all acid had been removed. After stripping off the toluene under reduced pressure the product was distilled to yield 134 g. of the substantially pure 2-(2-cyanoethoxy)ethyl acrylate, B. P. 109–11° C. at 5–1.0 mm., $N_D^{25}$ 1.4510, and analyzing 8.22 per cent nitrogen (calcd. N. for $C_8H_{11}O_3N$, 8.28%).

*Example 2*

A mixture consisting of 120 g. (0.93 moles) of 2-(2-hydroxyethoxy)-1-methylpropionitrile (from ethylene glycol and methacrylonitrile in the presence of a basic catalyst), 150 cc. of toluene, 2.0 g. of pyrogallol, 100 g. (1.34 mole) of glacial acrylic acid (containing a trace of methylene blue), about 0.5 g. of cupric chloride and 3 g. of benzenesulfonic acid was heated with stirring, in a flask equipped with a Dean-Stark water trap, at a temperature of from 115 to 125° C. for one hour. At the end of that time 14 cc. of water had collected in the trap. An additional 1 g. of benzenesulfonic acid was added and heating was continued for another hour with collection of another 4 cc. of water. The reaction mixture was then cooled to about 10–20° C. in an ice bath and then treated with 100 cc. of a saturated sodium chloride solution and 250 cc. of benzene. The whole was made neutral or slightly alkaline with solid sodium carbonate. The water layer which formed was removed and the organic layer washed with two 50-ml. portions of saturated sodium chloride solution. Distillation of the resulting organic layer under reduced pressure to remove the solvents and fractionation of the residue gave 128.5 g. 2-(2-cyanopropoxy)-ethyl acrylate, B. P. 110–112° C./1 mm., a clear, light colored liquid.

*Example 3*

A mixture consisting of 150 g. (.944 mole) of 2 - [2 - (2-hydroxyethoxy)ethoxy] propionitrile (from diethylene glycol and acrylonitrile in the presence of choline), 150 cc. of toluene, 2.2 g. of pyrogallol, 100 g. (1.39 mole) of glacial acrylic acid (containing a trace of methylene blue), about 0.5 g. cupric chloride and 3 g. of benzene-sulfonic acid was heated at 110–120° C. for 1.5 hours in a flask equipped with a water trap. During this time 18 cc. of water was collected. The reaction mixture was cooled, 400 cc. of benzene and 100 cc. of saturated sodium chloride solution was added and the whole then neutralized with sodium carbonate. After washing twice with a saturated sodium chloride solution the whole was allowed to stratify. The solvents were distilled from the organic layer under water pump pressure, and additional portions of inhibitor (cupric chloride and pyrogallol) were added to the residue, which upon fractionation gave 127.0 g. of the substantially pure 2-[2-(2-cyanoethoxy)ethoxy] ethyl acrylate, B. P. 140° C./1 mm., $N_D^{25}$ 1.4555.

*Example 4*

A mixture consisting of 101 g. (.783 mole) of 2-(2-hydroxypropoxy)propionitrile (from propylene glycol and acrylonitrile in the presence of a basic catalyst), 150 cc. of toluene, 2.0 g. of pyrogallol, 100 g. (1.39 mole) of glacial acrylic acid (containing methylene blue), about 0.5 g. of cupric chloride and 3 g. of benzene sulfonic acid was heated at 115–125° C. for 5 hours in a flask equipped with a water trap. During this time 8:5 cc. of water collected. Heating was continued for an additional 8.5 hours during which time repeated 0.5 g. portions of benzene-sulfonic acid were added to the reaction mixture whenever evolution of water appeared to cease. At the end of that time a total of 13.5 cc. of water had collected. The reaction mixture was then cooled to 10–20° C. in an ice bath, treated with 100 cc. of saturated sodium chloride solution and 250 cc. of benzene and neutralized with sodium carbonate. The organic layer was separated from the resulting stratified materials and washed with two 50 ml. portions of saturated sodium chloride solution. Removal of the solvents from the resulting organic layer by distillation under reduced pressure and fractionation of the residue gave 48.6 g. of the 1-(2-cyanoethoxy)-2-propyl acrylate, B. P. 105–110° C./0.5 mm.

*Example 5*

Into a reaction vessel equipped with a mechanical stirrer and adapted to a closed system there were charged 275 g. of water, 0.25 g. of an alkyl sulfate emulsifier known to the trade as Duponol ME and reported on page 4 of the August, 1945, issue of "Soap and Sanitary Chemicals," to be technical sodium lauryl sulfate, and 0.20 g. of sodium bisulfite. This charge was brought to a temperature of 41° C. in a nitrogen atmosphere, and then during a time of 1 hour there was added continuously 100 g. of 2-(2-cyanoethoxy)ethyl acrylate and 13 cc. of a catalyst mixture consisting of 25 g. of water, 0.04 g. of potassium persulfate and 0.75 g. of the emulsifier. During the next hour heating at about 40° C. was continued while another 12.5 g. portion of the catalyst mixture was introduced. The whole was then maintained at from 40–41° C., with stirring for an additional two hours. At the end of that time the resulting white emulsion was cooled and filtered to remove lumps. A soft, rubbery polymer was precipitated from the milky filtrate by addition of alcohol. The weight of the dried polymer was 86 g.

The resulting polymer was milled on cold rolls until a strippable sheet was formed (3.5 minutes). The sheet was then molded on press polish plates with a molding cycle consisting of a maximum temperature of 150° C. for 10 minutes and a cooling pressure of 500 p. s. i. Evaluation of the mechanical properties of the molded product employing American Society for Testing Materials procedures D638-46T, D412-41 and D445-46 and the Clash-Berg method for stiffness vs. temperature tests gave the following values:

| | |
|---|---|
| Ultimate strength _____ p. s. i__ | 144 |
| Total percent elongation _____ | 808 |
| Tensile product _____ | 1308 |
| $T_f$ _____° C__ | 23.8 |
| $T_{2000}$ _____° C__ | 7.5 |
| Stifflex range _____° C__ | 16.3 |

What we claim is:

1. Compounds having the formula

where R, R', R" and R''' are selected from the class consisting of hydrogen and the methyl radical and n is an integer of from 1 to 3.

2. 2-(2-cyanoethoxy)ethyl acrylate.
3. 2-(2-cyanopropoxy)ethyl acrylate.
4. 2-[2-(2-cyanoethoxy)ethoxy] ethyl acrylate.
5. 2-(2-cyanoethoxy)-1-methylethyl acrylate.
6. The process which comprises contacting acrylic acid with a hydroxyalkoxy nitrile having the formula

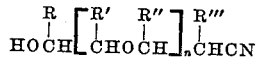

in which R, R', R" and R''' are selected from the class consisting of hydrogen and the methyl radical and n is an integer of from 1 to 3, in the presence of an esterifying catalyst and recovering from the resulting reaction product esters having the formula

where R, R', R" and R''' are selected from the class consisting of hydrogen and the methyl radical and n is an integer of from 1 to 3.

7. The process which comprises contacting acrylic acid with 2-(2-hydroxyethoxy(propionitrile in the presence of an esterifying catalyst and recovering 2-(2-cyanoethoxy)ethyl acrylate from the resulting reaction product.

8. The process which comprises contacting acrylic acid with 2-(2-hydroxyethoxy)-1-methyl-propionitrile in the presence of an esterifying catalyst and recovering 2-(2-cyanopropoxy)-ethyl acrylate from the resulting reaction product.

9. The process which comprises contacting acrylic acid with 2-[2-(2-hydroxyethoxy)ethoxy]propionitrile in the presence of an esterifying catalyst and recovering 2-[2-(2-cyanoethoxy)-ethoxy] ethyl acrylate from the resulting reaction product.

10. The process which comprises contacting acrylic acid with 2-(2-hydroxypropoxy)propionitrile in the presence of an esterifying catalyst and recovering 1-(2-cyanoethoxy)-2-propyl acrylate from the resulting reaction product.

11. A polymer of a cyano ether-ester having the formula

in which R, R', R'', and R''' are selected from the class consisting of hydrogen and the methyl radical and $n$ is an integer of from 1 to 3.

12. A polymer of 2-(2-cyanoethoxy)ethyl acrylate.

13. A polymer of 2-(2-cyanopropoxy)ethyl acrylate.

14. A polymer of 2-[2-(2-cyanoethoxy)ethoxy] ethyl acrylate.

15. A polymer of 1-(2-cyanoethoxy)isopropyl acrylate.

16. The process of preparing a synthetic rubber polymer which comprises heating, in the presence of a peroxide polymerization catalyst, an emulsion of a cyano ether-ester having the formula

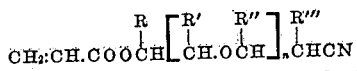

in which R, R', R'', and R''' are selected from the class consisting of hydrogen and the methyl radical and $n$ is an integer of from 1 to 3.

17. The process of preparing a synthetic rubber polymer which comprises heating an emulsion of 2-(2-cyanoethoxy)ethyl acrylate in the presence of a peroxide polymerization catalyst.

DAVID T. MOWRY.
EUGENE L. RINGWALD.
GEORGE L. WESP.

References Cited in the file of this patent

UNITED STATES PATENTS

| Number | Name | Date |
|---|---|---|
| 2,129,694 | Izard | Sept. 13, 1938 |
| 2,379,297 | Harmon et al. | June 26, 1945 |
| 2,396,434 | Rehberg et al. | Mar. 12, 1946 |
| 2,458,888 | Rehberg et al. | Jan. 11, 1949 |
| 2,495,214 | Crews | Jan. 24, 1950 |